Figure 1:
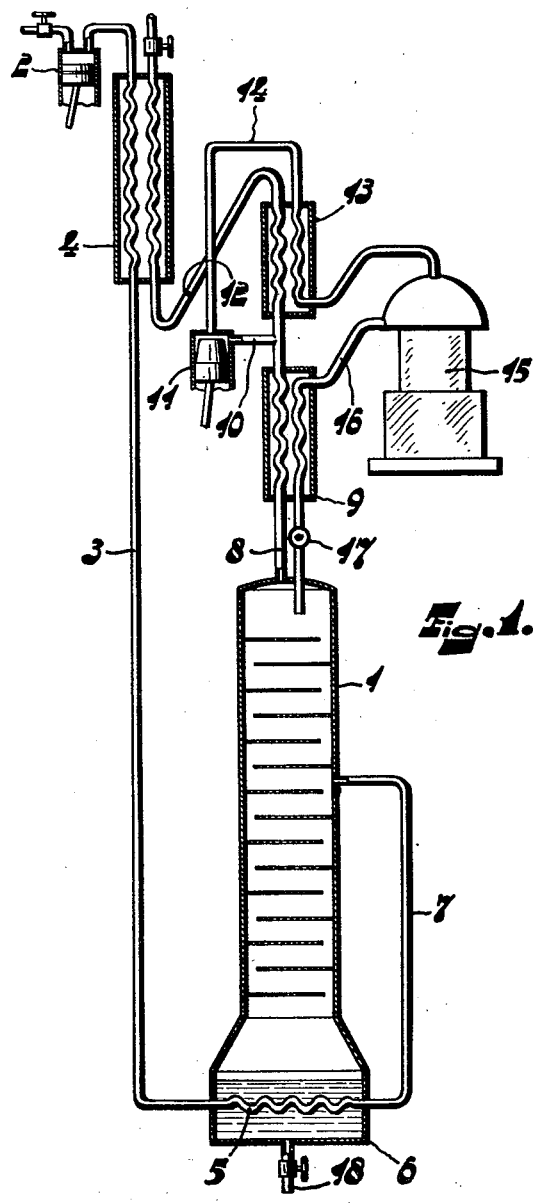

Oct. 8, 1957  H. FOKKER  2,808,710
METHOD OF FRACTIONATING GAS MIXTURES IN A RECTIFYING COLUMN
Filed July 6, 1955  2 Sheets-Sheet 1

INVENTOR
HERMAN FOKKER
BY
AGENT

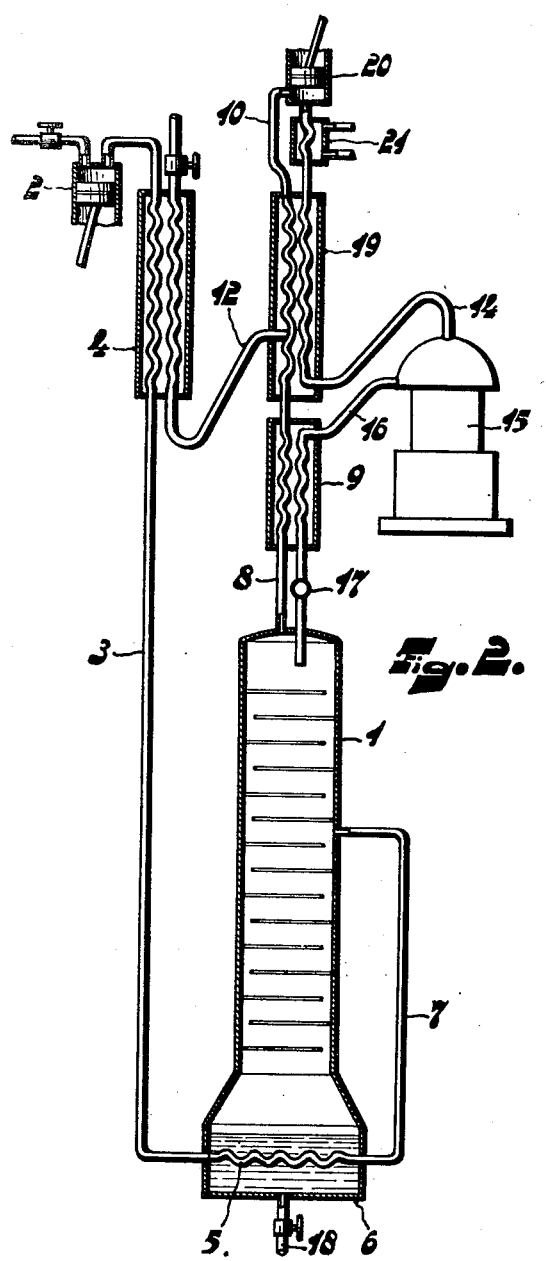

United States Patent Office 2,808,710
Patented Oct. 8, 1957

2,808,710

METHOD OF FRACTIONATING GAS MIXTURES IN A RECTIFYING COLUMN

Herman Fokker, Eindhoven, Netherlands, assignor, by mesne assignments, to North American Philips Company, Inc., New York, N. Y., a corporation of Delaware Application July 6, 1955, Serial No. 520,239

Claims priority, application Netherlands July 14, 1954

10 Claims. (Cl. 62—123)

The invention relates to methods of fractionating gas mixtures in a rectifying column, in which methods the gas mixture to be fractionated is supplied to the column at a point situated between the ends thereof, thermal energy being withdrawn from the column by means of a gas refrigerator. The term "gas refrigerator" as used herein is to be understood to mean a so-called refrigerator operating on the reversed hot-gas reciprocating engine principle. These refrigerators may be designed in various ways, for example, as a displacer device, as a double-acting device, as a device the cylinders of which are arranged in the form of a V or as a device the operating chamber of which directly communicates with that of a hot-gas reciprocating engine.

It is well known to condense the fraction with the highest boiling point which escapes from the rectifying column by means of a gas refrigerator, after which the condensation product is supplied to the column as reflux liquid. In this event the gas refrigerator condenses the gas at the temperature at which it is discharged from the column, for example at −196° C., when air is fractionated. However, the efficiency of refrigerators can be increased, if the device absorbs thermal energy at a higher temperature.

It has already been suggested to cause the gas refrigerator to absorb thermal energy at a higher temperature so that the efficiency of the engine is increased. In this event the thermal energy is absorbed at the boiling point of the fraction having the highest temperature, in the case of air at −183° C. Although in this case the system must comprise a compression device and an expansion device, yet the total efficiency of the system increases in spite of the compression work required.

An alternative solution, in which the refrigerator likewise absorbs thermal energy at a higher temperature and which also permits of improving the efficiency of the system, is obtainable if, in accordance with the invention, part of the fraction having the lowest boiling point which is produced in the column is compressed and subsequently cooled by means of a non-compressed part of the said fraction, after which the compressed and cooled part is further cooled due to thermal absorption by the gas refrigerator and is returned to the column after expansion, a non-compressed part of the fraction being drawn off from the system.

The term "fraction having the lowest boiling point" as used herein is to be understood to mean the medium available at the cold end of the column and this medium may consist of one or more components available at the hot end of the column.

According to a further aspect of the invention the part which is cooled by the gas refrigerator prior to expansion is further cooled by the fraction with the lowest boiling point, which permits of a further increase in the efficiency of the system.

According to an alternative method part of the fraction of the lowest boiling point is compressed by means of a compressor in the operating space of which the maximum temperature produced is less than 0° C., while the remaining, non-compressed part of said fraction cools the compressed part, after which the remaining, non-compressed part is drawn off from the system. In this event, if the compressor is designed as a reciprocating compressor, its piston may be provided with a cap so that the piston rings always engage a wall portion having a higher temperature, thus permitting difficulties with respect to lubrication to be avoided.

Preferably the fraction having the lowest boiling point is divided in two parts immediately after it has further cooled the part which is compressed and has already been cooled by the refrigerator.

According to a further method part of the fraction with the lowest boiling point is compressed by means of a compressor, the maximum temperature produced in the operating space of the compressor exceeding 0° C., while the compressed part after cooling is in heat-exchanging contact with the part supplied to the compressor.

If air is to be fractionated, the above-described methods may particularly be used to produce oxygen in the liquid state. In addition, the column may be designed in a simple form and the gas mixture to be fractionated may have only half an atmosphere of excess pressure between the inlet into the system, and the column, so that a compressor can be dispensed with.

According to the invention a system for fractionating gas mixtures is characterized in that it comprises a rectifying column to which the gas mixture to be fractionated is supplied at a point situated between its ends, a pipe for drawing off the fraction with the lowest boiling point from the column, which pipe divides in two branches, one of which is connected to a compressor whereas the other acts to drawn off the product, a heat exchanger provided in the high-pressure pipe of the compressor, in which heat exchanger the compressed gas is cooled by means of a non-compressed part of the fraction with the lowest boiling point, which high pressure pipe is connected to a gas refrigerator which is connected to the column through a pipe comprising an expansion device.

In one embodiment of the invention the pipe from the gas refrigerator to the column comprises a heat exchanger in which the medium which is discharged from the gas refrigerator is cooled by means of the fraction with the lowest boiling point, which heat exchanger is arranged between the refrigerator and the expansion device.

According to a further embodiment of the invention the high-pressure pipe comprises a heat exchanger in which the compressed gas is in heat-exchanging contact with the non-compressed part which is drawn off from the system.

According to an alternative embodiment of the invention the high-pressure pipe of the compressor comprises in succession a cooler and a heat exchanger, in which heat exchanger the compressed gas is further cooled by that part of the gas which is supplied to the compressor.

Two embodiments of the invention will now be described with reference, by way of example, to the accompanying drawings, in which Fig. 1 shows a gas fractionating system in which the compressed part of the fraction having the lowest boiling point is in heat-exchanging contact with the non-compressed part, while Fig. 2 shows a system in which the compressed part of said fraction is in heat-exchanging contact with the gas which is supplied to the compressor.

For the sake of simplicity, with reference to these embodiments the gas mixture to be fractionated will be referred to as air, however, the invention may also be used when different gas mixtures are to be fractionated, The system shown in Fig. 1 comprises a simple rectifying column 1. The air is supplied by means of a pump 2 to a pipe 3 in a manner such that the excess pressure of the air at a maximum is half an atmosphere. The pipe 3 comprises a heat exchanger 4 in which the air is cooled. Thereupon the air flows to a heat exchanger 5 arranged in a boiler 6 of the column 1. The air then flows through a pipe 7 to the column; the air is supplied to the column at a point situated between the two ends of the column. The column itself operates at substantially atmospheric pressure. In the column the air is fractionated. In the boiler 6 the oxygen, or a mixture with a high content of oxygen, is collected while gaseous nitrogen or a mixture with a high content of nitrogen escapes from the upper end of the column through a pipe 8.

The gas escaping from the column is heated in a heat exchanger 9 after which it is divided in two parts. One part flows to a compressor 11 through a pipe 10 while the other part is discharged from the system through a pipe 12 comprising a heat exchanger 13 and the heat exchanger 4.

The compressed part of the fraction having the lowest boiling point flows through a pipe 14 to the heat exchanger 13 and subsequently to a gas refrigerator 15. In this refrigerator the gas is further cooled after which it flows through a pipe 16 and the heat exchanger 9 to an expansion device 17 in which its pressure is reduced. The resulting liquid-gas mixture is supplied to the column in which the liquid acts as reflux liquid.

Liquid oxygen is drawn off from the boiler through a pipe 18.

In this embodiment the gas refrigerator will absorb thermal energy at a higher temperature, for example at −187° C. instead of at −196° C. The compressor 11 operates at a low temperature since the gas is supplied to it approximately at this temperature. If the compressor is a reciprocating compressor, this low temperature will increase the likelihood of lubrication difficulties. Consequently the compressor is of the kind in which the piston is provided with a cap so that the piston rings do not engage an excessively cold surface. The compression ratio can be low in this embodiment and may be approximately 1:2½. In the embodiment shown the fraction is divided in two parts after the total amount of gas has been heated in the heat exchanger 9, this division may, however, be effected before the heat exchanger 9 in accordance with the gas mixture to be fractionated; with certain gas mixtures the heat exchanger may even be entirely dispensed with.

In the embodiment shown in Fig. 2 parts corresponding to those of Fig. 1 are designated similarly. In this embodiment also the air is cooled in the heat exchanger 4 and subsequently supplied to the heat exchanger 5 through the pipe 3 so that the liquid oxygen contained in the boiler 6 of the column is partially evaporated while the air which is further cooled thereby is supplied to the column through the pipe 7.

The nitrogen is drawn off from the column through the pipe 8 and the heat exchanger 9, the temperature of the nitrogen being increased. Thereupon the nitrogen is further heated in a heat exchanger 19, a part, however, being drained off and escaping from the system through a pipe 12 and the heat exchanger 4. The remainder is further heated and discharged from this heat exchanger at substantially room temperature, after which through a pipe 10 it is supplied to a compressor 20 which may be designed as a normal reciprocating compressor and the pressure ratio of which may be 1:5 in this embodiment. The compressed nitrogen flows to the gas refrigerator 15 through a pipe 14 at a temperature of, for example, −179° C. This pipe comprises a water cooler 21 and the heat exchanger 19. The gas which is cooled by the gas refrigerator flows through a pipe 16 and the heat exchanger 9 to the expansion device 17 in which its pressure is reduced, after which the liquid-gas mixture produced is supplied to the column. From the boiler liquid oxygen is drawn off.

In this embodiment also the division may, depending upon the gas mixture to be fractionated, be effected either before the heat exchanger 9 or between the heat exchangers 19 and 9, while in certain cases the heat exchanger 9 may be entirely omitted.

What is claimed is:

1. A method of fractionating gas mixtures in a rectifying column comprising supplying said gas mixture to be fractionated to said column at a point intermediate of the ends thereof, fractionating said gas mixture in said column, compressing part of the fraction with the lowest boiling point produced in said column, cooling said compressed part by means of a non-compressed part of the fraction having the lowest boiling point, further cooling said compressed part by means of an external cold source which absorbs thermal energy, said external cold source being a cold-gas refrigerator comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber a higher temperature, the chambers being connected with one another through a cooler, regenerator and freezer, said cycle being performed independently of said fractionating process, conducting said compressed part of the fraction through an expansion device whereby its pressure is reduced, and supplying said compressed part to said column.

2. A method of fractionating gas mixtures in a rectifying column as set forth in claim 1 wherein said compressed part is further cooled by at least part of the fraction having the lowest boiling point after cooling by said cold-gas refrigerator and before being conducted through said expansion device.

3. A method of fractionating gas mixtures in a rectifying column as set forth in claim 1 wherein the compression space for compressing said part of the fraction has a maximum temperature of less than 0° C.

4. A method of fractionating gas mixtures in a rectifying column as set forth in claim 1 wherein the fraction having the lowest boiling point is divided into two parts immediately after said fraction has further cooled said compressed part.

5. A method of fractionating gas mixtures in a rectifying column as set forth in claim 1 wherein said compressed part of the fraction after being cooled is placed in heat exchanging relationship with the part of the fraction supplied to the compressor.

6. A method of fractionating gas mixtures in a rectifying column as set forth in claim 1 wherein said gas mixture is air, and oxygen is produced therefrom in a substantially liquid state.

7. A method of fractionating gas mixtures in a rectifying column as set forth in claim 1 wherein the pressure of the gas mixture to be fractionated between the inlet into the system and said column is a maximum of 1½ atmospheres.

8. A gas fractionating system comprising a rectifying column, means for supplying the gas mixture to be fractionated to said column at a point intermediate the ends thereof, a pipe for drawing off the fraction having the lowest boiling point from said column, said pipe being divided into two parts, a compressor, means connecting said compressor to one of the parts of said pipe, the other part of said pipe drawing off part of said fraction, a heat exchanger, a cold-gas refrigerator said cold-gas refrigerator comprising a cylinder, two pistons in said cylinder, means operating said pistons in said cylinder with a constant phase difference whereby two chambers are formed in which a closed thermodynamic cycle is performed by a gaseous medium of invariable chemical composition in one and the same state of aggregation, the volume of gaseous medium in said chambers varying continuously while one of said chambers has a higher temperature, a cooler, a regenerator, and a freezer connecting said two chambers, said cycle being performed independently of said fractionating process, means connecting said heat exchanger with said compressor and said cold gas refrigerator, means for conducting the non-compressed part of the fraction having the lowest boiling point into said heat exchanger whereby said compressed gas is cooled, conduit means connecting said cold gas refrigerator to said column, and an expansion device in said conduit means.

9. A gas fractionating system as set forth in claim 8 wherein said conduit means includes another heat exchanger arranged between said cold gas refrigerator and said expansion device, said heat exchanger containing at least a part of the fraction having the lowest boiling point for cooling said compressed gas.

10. A gas fractionating system as set forth in claim 8 further comprising a cooler and a heat exchanger mounted in succession in the system and connected between said compressor and said cold-gas refrigerator, said compressed gas being further cooled by means of part of the fraction supplied to said compressor.

References Cited in the file of this patent

UNITED STATES PATENTS

| | | |
|---|---|---|
| 1,571,461 | Van Nuys | Feb. 2, 1926 |
| 2,195,987 | Gomonet | Apr. 2, 1940 |
| 2,284,662 | Kahle | June 2, 1942 |
| 2,482,304 | Van Nuys | Sept. 20, 1949 |
| 2,627,731 | Benedict | Feb. 10, 1953 |

FOREIGN PATENTS

| | | |
|---|---|---|
| 699,262 | Great Britain | Nov. 4, 1953 |